(No Model.) 2 Sheets—Sheet 1.

G. W. JOLLY.
ANIMAL TRAP.

No. 289,268. Patented Nov. 27, 1883.

Witnesses,
Geo. H. Strong
J. A. Rouse

Inventor,
Geo. W. Jolly
B. Dewey & Co.
Attorneys (No Model.) 2 Sheets—Sheet 2.
G. W. JOLLY.
ANIMAL TRAP.
No. 289,268. Patented Nov. 27, 1883.
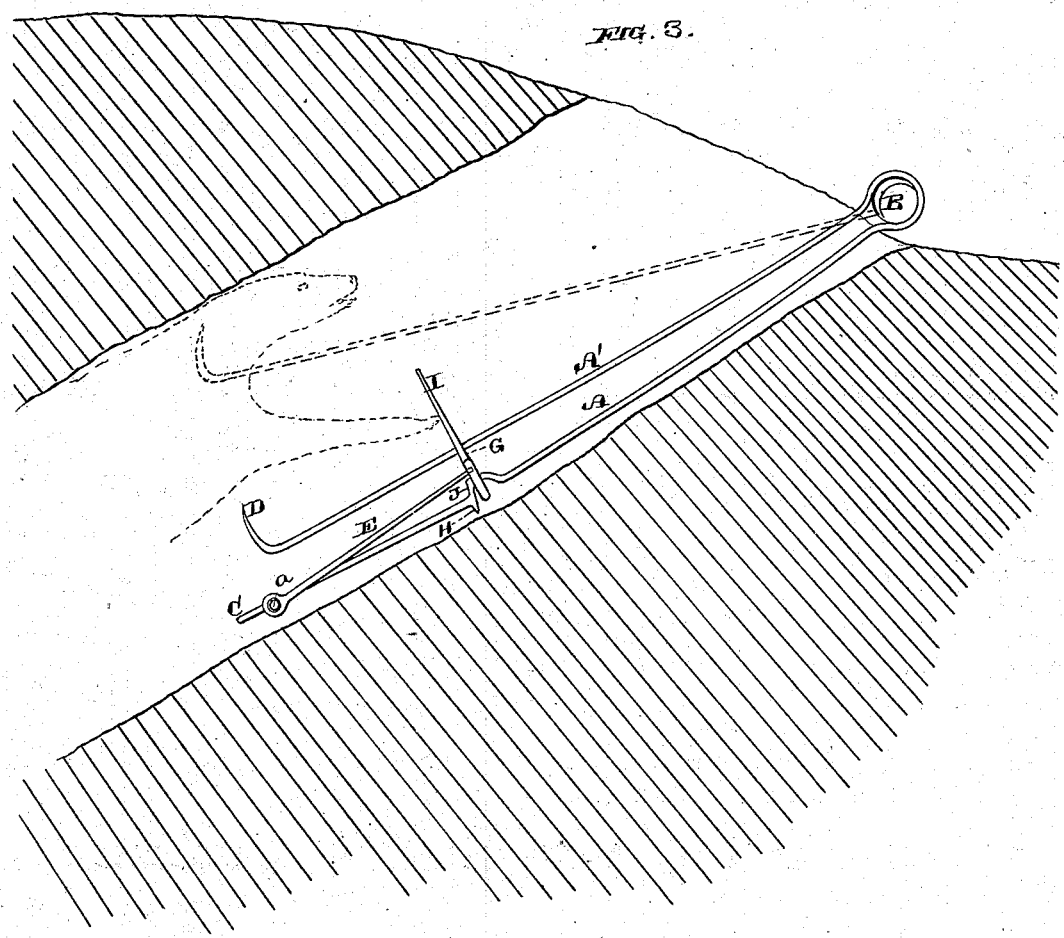

UNITED STATES PATENT OFFICE.

GEORGE W. JOLLY, OF PARAISO SPRINGS, ASSIGNOR OF ONE-HALF TO ISAAC J. HATTABAUGH, OF SAN JOSÉ, CALIFORNIA.

ANIMAL-TRAP.

SPECIFICATION forming part of Letters Patent No. 289,268, dated November 27, 1883.

Application filed June 12, 1883. (No model.)

*To all whom it may concern:*

Be it known that I, GEORGE W. JOLLY, of Paraiso Springs, county of Monterey, State of California, have invented an Improvement in Animal-Traps; and I hereby declare the following to be a full, clear, and exact description thereof.

My invention relates to certain improvements in animal-traps, which will be more fully explained by reference to the accompanying drawings, in which—

Figure 1:
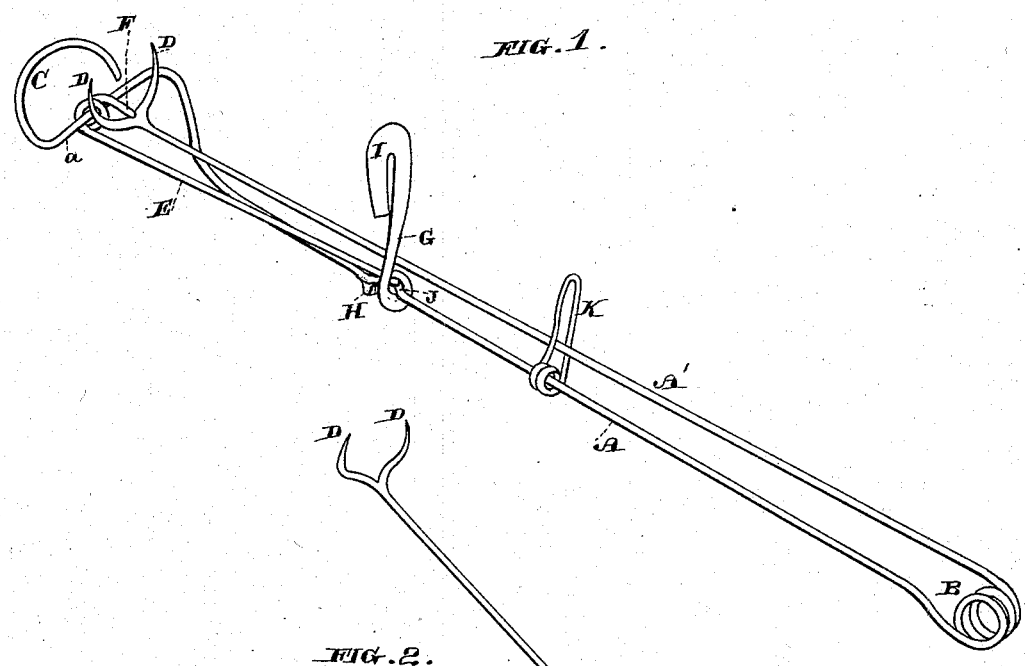
Figure 2:
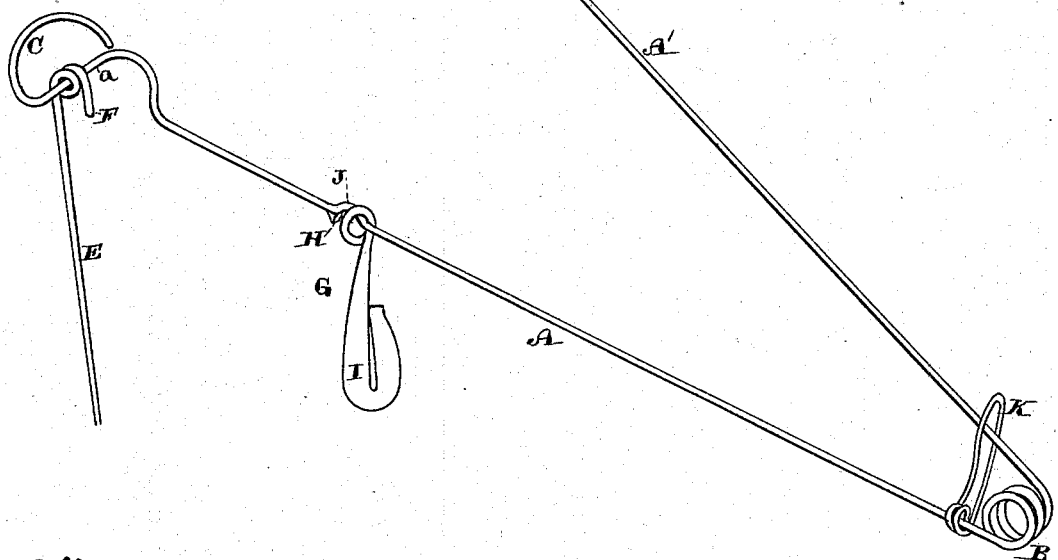

Figure 1 is a view of my trap set. Fig. 2 shows it after springing. Fig. 3 shows its application.

A A' is the main rod or frame, which is coiled so as to form an elastic spring at B. The lower arm, A, is bent horizontally at its outer end, with a curve, as at C, which serves as a base to keep it upright and steady it, as well as to provide an attachment for the trigger-lever. The upper arm, A', extends out over this curve, and when the two parts are pressed together the upwardly-projecting teeth D, which are formed upon the end of the arm A', are just above the curve C. The action of the coil-spring B tends to throw this toothed arm A' upward with great force. The short horizontal arm $a$ of the lower bar, A, which is formed between the two parts of the curve C, has a stout wire, E, bent around it to turn loosely. This wire E has a short arm, F, which lies over the fork of A' when the long arm E lies alongside the part A. A loop, G, fits loosely around the part A, so that it may be slipped forward to a stop, H, upon the under side, and it will then just clasp the end of the arm E and hold it in place. A flattened portion, I, extends upward from the loop G, and when the trap is set it is placed in the hole a short distance and covered with earth, leaving the part I projecting upward. The gopher, for which it is principally intended, pushes the dirt out of the hole ahead of himself, when it presses the post I back until the arm E is released from the loop G. The tension of the spring B immediately throws the released arm A' violently upward against the top of the hole and impales the gopher upon its point. Just back of the stop H is a short curve, J, made by bending the wire A upwardly at that point, so that when the loop G reaches the stop H it will be in this bend, which prevents its slipping back and releasing the catch when the trap is being inserted into the hole. A safety loop or ring, K, is made to slide upon the parts A A', and when slipped forward it prevents accidents while setting the trap. When slipped back close to the spring, it leaves the trap free to be released.

The advantage claimed for my trap is principally in the method of impalement of the animal against the upper part of the burrow, which thus effectually prevents its escape.

Having thus described my invention, what I claim as new, and desire to secure by Letters Patent, is—

1. In a trap having the spring B, arms A A', and barbs D, the curve C, with the horizontal portion $a$, in combination with the lever E F and the trigger I, substantially as herein described.

2. In a trap, the spring B, arms A A', and barbs D, lever E F, and trigger I, in combination with the stop H and the curve or depression J, substantially as herein described.

3. In a trap, the arms A A', adapted to separate upon release of the lever F, the upwardly-projecting barbs D, lever E F, and trigger I, in combination with the sliding safety loop or ring K, substantially as herein described.

In witness whereof I have hereunto set my hand.

GEORGE W. JOLLY.

Witnesses:
J. P. REEVE,
FRED FINE.